A. SUNDH.
COMBINED FRICTION AND SPUR GEARING.
APPLICATION FILED NOV. 16, 1911.
1,060,865.
Patented May 6, 1913.
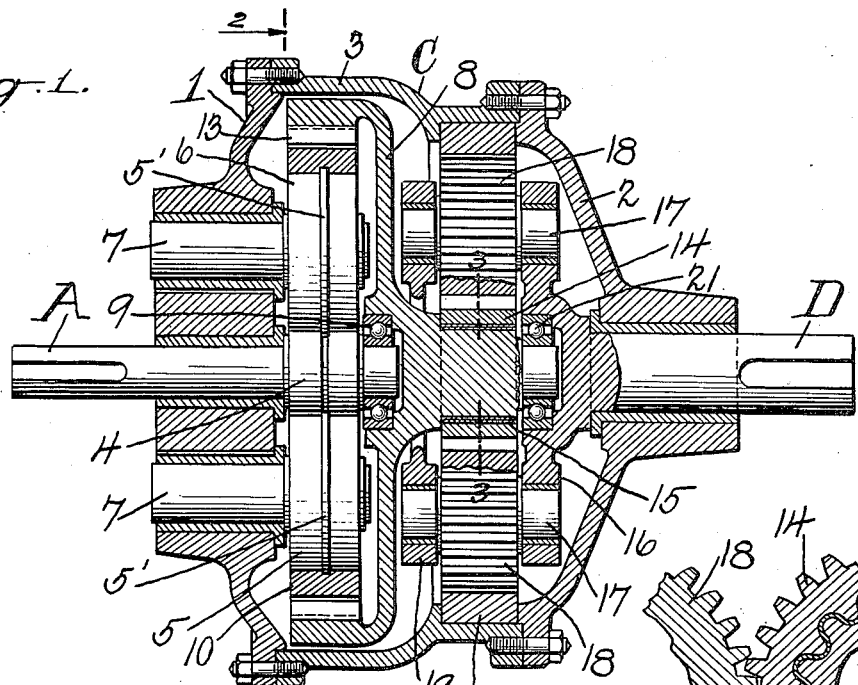
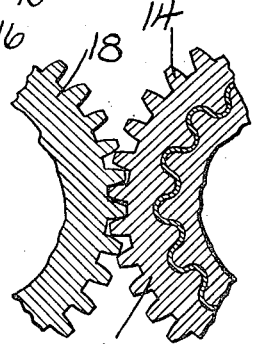
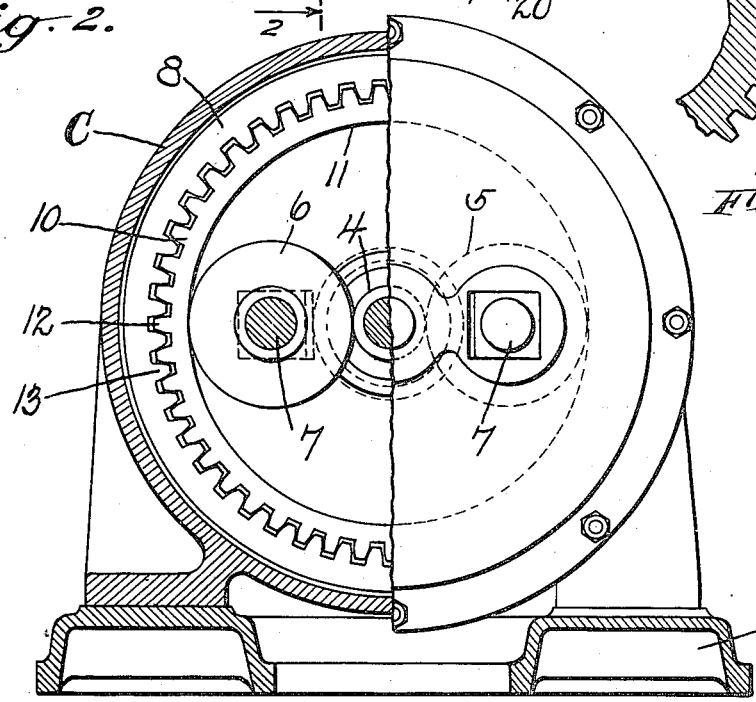
WITNESSES:
James G. Bethell
J. F. Rule
INVENTOR
August Sundh
BY
L. H. Campbell
ATTORNEY

UNITED STATES PATENT OFFICE.

AUGUST SUNDH, OF HASTINGS-UPON-HUDSON, NEW YORK.

COMBINED FRICTION AND SPUR GEARING.

1,060,865.  Specification of Letters Patent.  Patented May 6, 1913.

Application filed November 16, 1911. Serial No. 660,626.

*To all whom it may concern:*

Be it known that I, AUGUST SUNDH, a citizen of the United States, residing at Hastings-upon-Hudson, in the county of Westchester and State of New York, have invented a new and useful Improvement in Combined Friction and Spur Gearing, of which the following is a specification.

My invention relates to power transmitting apparatus comprising the combination of frictional and spur gearing.

The exact nature of the invention and the objects sought to be attained will appear hereinafter in the detailed description.

In the accompanying drawings which illustrate a construction embodying my invention, Figure 1 is a sectional plan view of the apparatus; Fig. 2 is an elevation view partly in section as indicated by the section line 2—2 of Fig. 1; Fig. 3 is a fragmentary view of a portion of the spur gearing, being a section on the line 3—3 of Fig. 1.

The power transmitting gearing is preferably inclosed in a casing C mounted on a base B. The casing comprises end plates 1 and 2 bolted to an intermediate section 3. The shaft A which may be termed the drive shaft, is journaled in the end plate 1. The shaft D which may be called the driven shaft is likewise journaled in the end plate 2. Intermediate gearing, comprising friction and spur gears, forms a driving connection between said shafts so that when the shaft A is driven at a high speed, the motion will be transmitted to the shaft D and operate the latter at a greatly reduced speed, as will appear more fully hereinafter. The shaft A is adapted to be connected to an electric motor, a gas engine, or any other suitable source of power depending on the particular use to which the invention is applied. The shaft D is likewise adapted to be connected to the driven mechanism. It will be understood of course that the shaft D might in some instances be used as a driving shaft and transmit power to the shaft A. Secured to the shaft A is a friction drive roller 4 in frictional rolling contact with friction rollers 5 and 6. The rollers 5 and 6 are carried on the shafts 7 journaled in the end plate 1. Within the casing is a gear member 8, recessed to receive the inner end of the shaft A. Roller bearings 9 are interposed between the member 8 and the shaft A. An annular member 10 surrounds the friction rollers with its inner surface 11 in frictional rolling contact with the rollers 5 and 6. Formed on the friction wheels 5 and 6 are ribs 5' which run in grooves formed in the gears 4 and ring 10, thereby preventing the relative movement of the friction gears in an axial direction. The periphery of the ring 10 is formed with spur gear teeth 12 in mesh with spur gear teeth 13 formed on the member 8. The ring 10 is supported by the friction gears 5 and 6, the weight of the ring serving by its wedging action to hold the friction rollers 5 and 6 against the roller 4 with a considerable pressure, and also to maintain sufficient pressure between the ring 10 and the rollers to insure a good frictional driving contact. It will be observed that the shafts 7 are provided with bearings which permit automatic adjustment of the friction rollers. The spur gear teeth on the gears 10 and 8 permit any relative movement of the said gears that may be necessary to maintain the friction driving surfaces in proper contact, while at the same time maintaining a positive driving relation of the spur gears. The hub of the member 8 carries a spur gear 14. The opposing surfaces of said hub and gear are corrugated or waved and a strip or band 15 of spring steel or other suitable material is interposed in one or more layers between said parts. This forms an elastic or self adjusting connection between the hub and gear 14. The specific construction and operation of this connection are disclosed in my co-pending application for patent for gearing, Serial No. 647,464, filed September 5, 1911.

The inner end of the shaft D is provided with a plate or disk 16 in which are journaled stud shafts 17. The shafts 17 carry spur gears 18 intermeshing with the gear 14. At the opposite side of the gears 18 from the plate 16 is an annular member 19 in which the inner ends of the shafts 17 are journaled. This member 19 is free to rotate with the plate 16. Surrounding the gears 18 is a gear ring 20 formed with internal gear teeth in mesh with the gears 18. This ring 20 is clamped in the casing and held stationary. The plate 16 forms a bearing for the hub of the member 8, the end of the said hub extending within a recess formed in the plate 16. Ball bearings 21 are interposed between the said hub and plate.

The operation is as follows: The rotation of the drive shaft A imparts movement to the friction wheels 5 and 6, the latter transmitting the motion to the gear ring 10. The peripheral speed of the ring 10 is much less than that of the drive shaft. The ring 10 acts as a positive driving means to rotate the member 8. The gear 14 carried by the member 8 rotates the gears 18 and the latter are therefore caused to travel around the stationary annular gear 20. The gears 18 carry with them the plate 16 thereby rotating the driven shaft D. It will be noted that the speed of the shaft D is materially reduced as compared with that of the member 8.

It will be seen that the present invention involves a simple and compact form of speed reduction mechanism combining the advantages of the friction gearing for effecting a reduction from a high speed and positive spur gearing for a further reduction. The arrangement of the ring 10 and annular member 8 provides a simple and effective means for transmitting the power from the gear ring while at the same time permitting the relative movement of the latter necessary to maintain a proper adjustment of the friction gears. It will be further noted that the drive shaft A and the driven shaft D are in alinement or have a common axis which is of material advantage in many cases, as for example where the reduction mechanism forms a connection between an electric motor and a hoisting drum. In this instance the drive shaft will be keyed directly to the motor shaft and the driven shaft D keyed to the drum shaft.

I wish not to be limited to the exact construction and arrangement herein shown, as various modifications might be used without departing from the spirit and scope of my invention.

What I claim as new and desire to secure by Letters Patent of the United States is:

1. The combination of friction rollers, an annular member surrounding and holding said rollers in frictional contact, and a gear surrounding said annular member and having a driving connection therewith.

2. The combination of friction driving elements, an annular member surrounding and in frictional contact with said elements, and an annular gear surrounding and in driving engagement with the said annular member.

3. The combination of concentric intermeshing spur gear rings, friction gearing in driving connection with one of said rings, and gearing having a positive driving connection with the other of said rings.

4. The combination of concentric rings having intermeshing spur gear teeth, friction gearing within the inner ring, and gearing having a positive driving connection with the outer ring.

5. The combination of a friction driving roller, friction rollers in contact therewith, a ring surrounding said rollers and in frictional contact therewith and having spur gear teeth formed on its periphery, and spur gearing driven by said spur gear teeth.

6. The combination of friction rollers, a ring surrounding and in frictional rolling contact with said rollers and having spur gear teeth carried on its periphery, and a rotatable member provided with an annular series of gear teeth in mesh with said first-named gear teeth.

7. The combination of a friction driving roller, friction rollers in contact therewith, a member surrounding and in frictional contact with said rollers and having gear teeth thereon, and a second member concentric with said first named member, and provided with gear teeth coöperating with said first named gear teeth.

8. The combination of a drive shaft, a friction driving element, carried thereby, friction rollers engaging said element, a ring surrounding and in frictional rolling contact with said rollers, a rotatable member having a bearing on the drive shaft, and means forming a driving connection between said rotatable member and said ring.

9. The combination of a drive shaft, friction speed reduction gearing driven by said shaft and comprising a friction ring provided with gear teeth on its periphery, a rotatable member concentric with said shaft and provided with gear teeth in mesh with said first named gear teeth, and antifriction rollers between the drive shaft and said rotatable member.

10. The combination of a drive shaft, a driven shaft, and an intermediate member all rotatable about a common axis, a ring, friction gearing between the drive shaft and said ring, means to transmit the movement of the ring to said intermediate member, and spur gearing between the said intermediate member and the driven shaft.

11. The combination of a drive shaft, a driven shaft, an intermediate power transmitting member supported on said shafts and rotatable relatively thereto, speed reduction friction gearing between the drive shaft and said member, and speed reduction gearing between said member and the driven shaft.

12. The combination of a drive shaft, a driven shaft, and an intermediate power transmitting member, all rotatable about a common axis, friction gearing between the drive shaft and the said intermediate member, and planetary spur gearing between the said member and the driven shaft.

13. The combination of a drive shaft, a driven shaft, and an intermediate member all rotatable about a common axis, a gear ring in driving engagement with said member, friction speed reduction mechanism between the drive shaft and said ring, a spur gear carried by said member, a stationary spur gear ring, gear wheels in mesh with said spur gear and gear ring, and a member connected to the driven shaft and carrying said gear wheels.

In testimony whereof, I have signed my name to this specification in the presence of two subscribing witnesses.

AUGUST SUNDH.

Witnesses:
JAMES G. BETHELL,
J. F. RULE.